United States Patent [19]

Rickly et al.

[11] Patent Number: 4,574,075

[45] Date of Patent: Mar. 4, 1986

[54] PURIFICATION OF ALKALI METAL NITRATES

[75] Inventors: Jack D. Rickly, Dumont, N.J.; B. Timothy Pennington, Sulphur, La.

[73] Assignee: Olin Corporation, Cheshire, Conn.

[21] Appl. No.: 678,858

[22] Filed: Dec. 6, 1984

[51] Int. Cl.$^4$ ............................................ C01F 11/36
[52] U.S. Cl. .................................... 423/184; 423/198
[58] Field of Search ................ 423/184, 198, 55, 140, 423/144, 395, 192, 194

[56] References Cited

U.S. PATENT DOCUMENTS 4,517,164  5/1985  Fiorucci et al. .................... 423/184

OTHER PUBLICATIONS

J. W. Mellor, *Inorganic and Theoretical Chemistry*, vol. VIII, pp. 476–478 (Mar. 1947), Longmans, Green and Co.

Primary Examiner—John Doll
Assistant Examiner—Wayne A. Langel
Attorney, Agent, or Firm—Donald F. Clements; James B. Haglind

[57] ABSTRACT

A process is disclosed for removing heavy metal contaminants from impure alkali metal nitrates containing them. The process comprises mixing the impure nitrates with sufficient water to form a concentrated aqueous solution of the impure nitrates, adjusting the pH of the resulting solution to preferably within the range of between about 2 and about 4, adjusting the nitrite ion concentration to between about 0.07 molar and about 1.0 molar, to effect reduction of the heavy metal contaminants, adjusting the pH of the reduced solution to effect precipitation of heavy metal impurities, and separating the solid impurities from the resulting purified aqueous solution of alkali metal nitrates. The resulting purified solution of alkali metal nitrates may be heated to evaporate water therefrom to produce purified molten alkali metal nitrate suitable for use as a heat transfer medium. If desired, the purified molten form may be granulated and cooled to form discrete solid particles of alkali metal nitrates.

22 Claims, No Drawings

PURIFICATION OF ALKALI METAL NITRATES

This invention relates to the purification of alkali metal nitrates. More particularly, it is directed to the removal of heavy metal contaminants from a mixed alkali metal nitrate heat transfer medium.

The energy crisis has generated the investigation of a large number of alternate sources of power. One technique presently under investigation is the use of solar energy to raise the temperature of a suitable heat transfer medium and convey the heat transfer medium to a suitable steam generator or to a heating system for an inhabited dwelling. One heat transfer medium under intensive investigation at this time is the eutectic mixture of sodium nitrate and potassium nitrate. This mixture usually contains about 60 percent by weight of sodium nitrate and about 40 percent by weight of potassium nitrate, but may contain from about 30 to about 70 percent by weight of sodium nitrate and between about 30 and about 70 percent by weight of potassium nitrate. Mixtures of this type may have a relatively low melting point, i.e. about 400° F., and have a relatively low viscosity in the molten state. As a result, it can be easily transferred by pumping or otherwise within a closed system.

Sodium nitrate and potassium nitrate frequently contain heavy metal contaminants as well as anionic contaminants in the form of carbonates, oxides and sulfates. In addition, when the molten form of the mixed nitrate is circulated in the solar power system or industrial process heat systems, small quantities of heavy metal impurities may be dissolved from the materials of construction used as conduits, storage tanks and the like. In addition, local hot spots in the solar energy system may cause degradation of the alkali metal nitrates to form oxides, oxygen and nitrogen. The oxides may react with water and carbon dioxide to form hydroxides and carbonates.

There is a need at the present time to provide a process for reducing the heavy metal contaminants found in alkali metal nitrates, particularly those used in the preparation of solar energy heat transfer medium.

It is a primary object of this invention to provide an improved process for purifying alkali metal nitrates.

It is another object of this invention to provide a process for reducing the concentration of heavy metal impurities present in alkali metal nitrates.

Still another object of the invention is to provide a process for purifying mixed alkali metal nitrates utilized as a heat transfer medium in solar energy systems and industrial process heat systems.

A further object of the invention is to provide a process for purifying eutectic mixtures of sodium nitrate and potassium nitrate.

These and other objects of the invention will be apparent from the following detailed description thereof.

It has now been discovered that the foregoing objects are accomplished in a process for removing heavy metal contaminants from impure alkali metal nitrates containing them, which comprises:
a. admixing the impure alkali metal nitrates with sufficient water to form an aqueous solution thereof;
b. adjusting the pH of the aqueous solution to preferably within a range from between about 2 to about 4;
c. adjusting the concentration of nitrite ion in the aqueous solution to within the range between about 0.07 molar and about 1.0 molar to reduce heavy metal contaminants contained therein;
d. adjusting the pH of the reduced concentrated aqueous solution to a pH of at least about 6 to effect precipitation of solid heavy metal contaminants within said concentrated aqueous solution; and
e. separating said solid heavy metal contaminants from the resulting purified solution of alkali metal nitrate.

More in detail, any alkali metal nitrate containing heavy metal impurities may be purified by the process of this invention. Typical examples of alklai metal nitrates include sodium nitrate, potassium nitrate, and lithium nitrate, or mixtures thereof. The process of this invention is particularly effective when treating a solar or industrial heat transfer medium comprised of an eutectic mixture of sodium nitrate and potassium nitrate, wherein the sodium nitrate concentration is about 60 percent by weight and the potassium nitrate concentration is about 40 percent by weight. However, the concentration of sodium nitrate and potassium nitrate may each range from about 30 to about 70 percent by weight of the mixture.

The process of this invention may be utilized in the purification of alkali metal nitrates in solid or molten form. For example, sodium nitrate solids obtained by conventional mining and beneficiating techniques, which may contain heavy metal contaminants in the range of from about 0.03 to about 0.15 percent by weight may be processed in accordance with the process of this invention. In addition, the process of this invention is useful in the purification of impure mixed nitrates produced synthetically, or impure mixed nitrates obtained from solar heat systems, which may contain heavy metal impurities within the range from about 0.03 to about 0.5 percent by weight.

The impure alkali metal nitrates are dissolved in sufficient water to form an aqueous solution having an alkali metal nitrate concentration within the range of from between about 20 to about 70 and preferably between about 30 and about 50 percent by weight. Either solid, molten, or solution forms of the alkali metal nitrates may be added to the water.

Sufficient acid is added to the aqueous alkali metal nitrate solution to adjust the pH thereof to within the range from about 2 to about 6 and preferably from about 2 to about 4. Any suitable acidic substance which is nonreactive with the alkali metal nitrates may be utilized for this purpose. It is preferred to utilize nitric acid since it does not add foreign anions to the alkali metal nitrate being treated. However, if anionic impurity is not a problem, then any other suitable acids such as sulfuric acid, hydrochloric acid, phosphoric acid and the like may be employed. It is preferred to employ a concentrated mineral acid when adjusting the pH in order to minimize the amount of water that may ultimately have to be evaporated to obtain the desired purified molten product. However, any suitable concentration of acid may be utilized.

After the pH of the aqueous solution of alkali metal nitrate has been adjusted to the desired level, the concentration of nitrite anion in the aqueous solution is adjusted to effect reaction of the nitrite ion with the heavy metal impurities present. Sufficient nitrite ion is added to the aqueous solution to provide at least about 6 times the stoichiometric amount, and preferably between about 8 and about 15 times the stoichiometric amount necessary to reduce all of the heavy metal contaminants to a reduced valent state. Sodium nitrite is preferred for use as the nitrite ion forming agent, but other nitrite compounds such as potassium nitrite, lithium nitrite, cesium nitrite, and the like, barium nitrite, strontium nitrite, calcium nitrite and mixtures thereof which form nitrite ions in aqueous solutions may also be employed. In addition, nitrite ions formed in situ, for example, by electrolysis of aqueous solutions of alkali metal nitrates, or by bubbling equimolar mixtures of NO and $NO_2$ through an aqueous alkali metal hydroxide or alkali metal carbonate solution may also be employed as a source of nitrite ion. However, a cation should not be used if it is undesirable in the alkali metal nitrate.

The nitrite ion forming compound is added in solid form or in the form of a concentrated aqueous solution to the lowered pH aqueous solution of alkali metal nitrate in order to minimize the amount of water ultimately evaporated from the alkali metal nitrate solution. Generally the concentration of the nitrite ion in the aqueous solution is in the range of between about 0.25 and about 2.0 and preferably from about 0.5 to about 1.50 percent by weight. Occasionally nitrite impurities build up in the molten alkali metal nitrate solar energy system. When analysis of the molten salt shows that the concentration is within the above ranges, the heavy metal impurities can be precipitated in accordance with the process of this invention without the need to add additional nitrite ion forming compound to adjust the concentration.

In order to effect precipitation of the heavy metal impurities after the nitrite ion concentration has been adjusted to within the above range, a basic material is added to the aqueous solution of alkali metal nitrate in a proportion sufficient to increase the pH of the solution above about 6, generally between about 6 and about 8, and preferably between about 7 and about 7.5. A basic material such as alkali metal hydroxide, including sodium hydroxide and potassium hydroxide, is preferably used to adjust the pH because these bases do not add interfering cations to the alkali metal nitrate component. However, other basic materials such as calcium hydroxide and calcium oxide may also be used, if desired. The base may be added as a solid or as an aqueous solution having a base concentration in the range between about 10 and about 70, and preferably between about 30 and about 50 percent by weight. It is preferred to add more concentrated solutions of the basic material in order to eliminate the need for evaporating water from the purified alkali metal nitrate solution.

Addition of the basic material at the above pH levels and in the above proportions effects precipitation of the heavy metal impurities within the aqueous alkali metal nitrate solution.

After the impurities have been precipitated, they are separated from the resulting purified aqueous solution of alkali metal nitrate by any conventional solid-liquid separation technique such as filtration, centrifuging, decanting, and the like. If desired, the separated precipitate may be washed with water to remove any alkali metal nitrate values contained in the solid precipitate. The wash water containing dissolved nitrates may be used to dissolve impure alkali metal nitrate as described above.

The solid heavy metal impurities are collected and may be discharged to a suitable waste area or landfill. The purified aqueous alkali metal nitrate solution may be heated to evaporate water therefrom, if desired, to form a molten form of the alkali metal nitrate. As indicated above, a eutectic mixture of sodium nitrate and potassium nitrate is a preferred ingredient for purifying in accordance with the process of this invention.

When admixing the impure aqueous alkali metal nitrate solution with acid, the nitrite ion compound and basic material to effect the pH lowering, control of the nitrite ion concentration, and the pH raising, respectively, suitable agitation means are employed. Frequently, when the basic material is added to precipitate the heavy metal impurities, a porous floc-type precipitate forms. It is important that mild agitation be used at this point in order to prevent breaking up the precipitate into finely divided particles, since the floc-type precipitate is generally easier to separate by filtration or centrifuging.

The temperature of the aqueous alkali metal nitrate solution is maintained in the range between about 25° and about 85° C. during the period that acid, nitrite ion compound agent, and basic material are added thereto. Higher or lower temperatures may be employed, if desired, in order to optimize the reduction and precipitation reactions.

Heavy metal impurities which are separated from the aqueous alkali metal nitrate solution as solid precipitate in accordance with the process of this invention, include heavy metals such as chromium, nickel, molybdenum, iron and copper. These compounds may originally be in the form of nitrates, nitrites, carbonates, hydroxides, and oxides. Since many of the impurities are obtained by contact of the mixed alkali metal nitrate in molten form with materials of construction in the solar energy system, there is a need to control these foreign impurity components as much as possible. Purification of a bleed stream from the solar energy system or the individual components of the heat transfer medium can be accomplished with the process of this invention, thus eliminating the need for a complete plant shutdown to effect treatment.

The following examples are presented in order to define the invention more fully without any intention of limiting the invention. All parts and percentages are by weight unless otherwise specified.

EXAMPLE 1

A stock solution containing 240.2 grams sodium nitrate, 160 grams potassium nitrate and 1.86 grams potassium chromate was dissolved in deionized water and diluted to a volume of 1 liter to give a total salt content of about 400 grams per liter. 50 Milliliters of this stock solution was added to a 400 milliliter beaker and 0.6425 grams sodium nitrite ($NaNO_2$). This gave a molar ratio of chromium$^{6+}$ to nitrite ion of approximately 1 to 13. The pH was adjusted to 2.0 using 10 percent nitric acid. The solution was heated with magnetic stirring to about 80°–85° C. and held there for 30 minutes. The solution turned blue-green in color after 10 minutes. At the end of 30 minutes, the pH was adjusted to 7.0 using 10 percent sodium hydroxide. Immediately a dark green precipitate began to form. After 15 minutes the solution appeared colorless above the dark green precipitate. The solution was filtered at this time through a 10 micron glass fritted funnel The precipitate and filtrate were analyzed by both atomic adsorption for total chromium and EDTA titration for chromium$^{3+}$. Atomic absorption analysis of the precipitate showed it to contain 0.028 grams total chromium, and EDTA titration showed it to contain 0.026 grams chromium as chromium$^{3+}$ (theoretical amount of chromium 0.025 grams). Analysis of the filtrate indicated less than 1 microgram per milliliter total chromium versus 500 micrograms per milliliter starting concentration of chromium$^{6+}$. This represents 99.8 percent removal of chromium$^{6+}$ and nearly complete conversion of chromium$^{6+}$ to chromium$^{3+}$.

EXAMPLE 2

A solution was prepared as in EXAMPLE 1 except that 0.3216 grams of sodium nitrite was used instead of 0.6425 grams as used in EXAMPLE 1 and a chromium$^{6+}$ to nitrite ion molar ratio of about 1:6.5. The solution was adjusted in pH to 2.0 and heated to about 85° C. for 30 minutes. After 10 minutes, the solution color was still yellow-orange, and after 30 minutes, a brown precipitate had formed, but the solution was still yellow. The precipitate was collected by filtration as in EXAMPLE 1 and analyzed for total chromium and chromium$^{3+}$. Results of the analysis showed 0.022 grams total chromium, 0.008 grams chromium$^{3+}$. Analysis of the filtrate showed 54 micrograms per milliliter total chromium versus a starting concentration of about 500 micrograms per milliliter. This represents 89.2 percent removal of chromium and a 32 percent conversion of chromium$^{6+}$ to chromium$^{3+}$.

EXAMPLE 3

Three solutions identified as Solutions A, B, and C, respectively, were prepared as in EXAMPLE 1. The amount of sodium nitrite added to each solution was 0.6468 grams, 0.6246 grams, and 0.6359 grams, respectively, to Solutions A, B, and C. The temperature of each solution was brought up to 70° C. The pH of each solution was adjusted using 10 percent nitric acid to 5.0, 4.0 and 3.0 for solutions A, B, and C, respectively. Each solution was held at 70° C. for one hour and the pH was then adjusted to 7.0. The solution was filtered after 15 minutes and a precipitate was analyzed for total chromium and chromium$^{3+}$. The results of these analysis are as follows: solution A precipitate showed 0.0053 grams total chromium and 0.0017 grams of chromium$^{3+}$; solution B precipitate showed 0.0071 grams total chromium and 0.0032 grams chromium$^{3+}$; solution C precipitate showed 0.0175 grams total chromium and 0.0163 grams chromium$^{3+}$. The theoretical amount of chromium present in each solution was 0.0249 grams. The results are summarized below in Table I:

TABLE I

| pH | % Chromium Removed | % Chromium$^{6+}$ Reduced to Chromium$^{3+}$ |
| --- | --- | --- |
| 5.0 | 21.3 | 6.8 |
| 4.0 | 28.5 | 12.9 |
| 3.0 | 70.3 | 65.5 |
| 2.0 | 99.8 | 99.8 |

EXAMPLE 4

To 100 milliliters of a solution containing a mix of 35 percent sodium nitrate and 65 percent potassium nitrate having a density of approximately 1.4 grams per liter in such an amount as equal 50 percent by weight of the solution was added 0.2282 grams potassium chromate, K$_2$CrO$_4$, 0.1072 grams cobalt nitrate, Co(NO$_3$)$_2$, 0.1121 grams of nickel nitrate, , Ni(NO$_3$)$_2$, 0.1503 grams ferric nitrate, Fe(NO$_3$)$_3$, and 2.622 grams sodium nitrite, NaNO$_2$. Under conditions of vigorous stirring, the temperature was brought up to 35° C. and maintained there throughout the experiment. The pH was adjusted to 2.0 using 10 percent nitric acid. After waiting 5 minutes, the pH was adjusted to 7.1 using 12.6 milliliters of 10 percent sodium hydroxide. After waiting 2 minutes, the solution was filtered through a fine frit. This required a filtration time of 15 minutes. The precipitate was dark blue-green and the filtrate was nearly colorless. The precipitate was collected and dried at 120° C. for 2½ hours.

The dried precipitate weighed 0.3215 grams and was found to contain 0.0606 grams total chromium, 0.0601 grams chromium$^{3+}$, 0.0331 grams total cobalt, 0.0342 grams total nickel and 0.0338 grams total iron. The filtrate was found to contain 8 micrograms per milliliter total chromium. The percent of chromium removed was 98.9 percent.

The filtrate solution was evaporated to dryness. The weight of the dried salt recovered was 69.75 grams, or 97.6 percent of the theoretical amount. Analysis of the salt showed it to contain 1.1 percent nitrite, 63.1 percent nitrate, 9.8 percent sodium, and 24.8 percent potassium. The salt dissolved in an equal weight of water with the total amount of salt equalling 40 percent by weight of the solution. The solution was found to be neutral in pH and was therefore shown to contain less than 10$^{-5}$ moles per kilogram of hydroxide or carbonate. Analysis of insolubles showed less than 5 parts per million.

We claim:

1. The process for removing heavy metal contaminants from an impure alkali metal nitrate containing them which comprises:
   a. admixing said impure alkali metal nitrate with sufficient water to form an aqueous solution thereof;
   b. adjusting the pH of said aqueous solution to within the range from between 2 and about 6;
   c. adjusting the concentration of nitrite ion in said aqueous solution to provide at least six times the stoichiometric proportion necessary to reduce said heavy metal impurities contained therein;
   d. admixing sufficient basic material with the aqueous alkali metal nitrate solution to raise the pH of the resulting mixture to above about 6, whereby a precipitate of solid heavy metal contaminants forms within said aqueous solution; and
   e. separating said solid heavy metal contaminants from the resulting purified aqueous solution of alkali metal nitrate.

2. The process of claim 1 wherein sufficient water is added to said alkali metal nitrate to form an aqueous solution containing from between about 20 and about 70 percent by weight of alkali metal nitrate.

3. The process of claim 2 wherein said nitrite ion concentration in said aqueous solution is in the range between about 8 and about 15 times the stoichiometric proportion required to reduce said heavy metals contained therein.

4. The process of claim 3 wherein said nitrite ion concentration is adjusted by adding to said aqueous alkali metal nitrate a nitrite compound selected from the group consisting of sodium, potassium, lithium, cesium, barium, strontium and calcium nitrites and mixtures thereof.

5. The process of claim 3 wherein said nitrite concentration is achieved by buildup of impurities during use as a heat transfer medium.

6. The process of claim 4 wherein said compound is sodium nitrite.

7. The process of claim 1 wherein the pH of said aqueous solution of said alkali metal nitrate is adjusted with an acid selected from the group consisting of nitric acid, sulfuric acid, phosphoric acid, and hydrochloric acid.

8. The process of claim 7 wherein said acid is nitric acid.

9. The process of claim 8 wherein the pH of said aqueous solution is adjusted with a basic material selected from the group consisting of sodium hydroxide, potassium hydroxide, calcium hydroxide and calcium oxide.

10. The process of claim 9 wherein said basic material is sodium hydroxide.

11. The process of claim 1 wherein the temperature of said aqueous solution of alkali metal nitrate is maintained in the range between about 25° and about 85° C.

12. The process of claim 11 wherein said heavy metal impurities are selected from the group consisting of chromium, nickel, molybdenum, iron, and copper.

13. The process of claim 12 wherein said heavy metal impurity is chromium.

14. The process of claim 13 wherein the resulting purified aqueous solution of alkali metal nitrate is heated to effect evaporation of water therefrom and form a purified molten alkali metal nitrate.

15. The process of claim 14 wherein said purified molten alkali metal nitrate is granulated and cooled to form discrete solid particles of said alkali metal nitrate.

16. The process of claim 10 wherein said alkali metal nitrate is sodium nitrate.

17. The process of claim 10 wherein said alkali metal nitrate is potassium nitrate.

18. The process of claim 10 wherein said alkali metal nitrate is a mixture of potassium nitrate and sodium nitrate.

19. The process of claim 18 wherein said mixture contains between about 30 percent and about 70 percent by weight of sodium nitrate and between about 30 percent and about 70 percent by weight of potassium nitrate.

20. The process of claim 19 wherein said alkali metal nitrate contains about 60 percent by weight of sodium nitrate and about 40 percent by weight of potassium nitrate.

21. The process of claim 7 wherein said pH is adjusted to the range between about 2 and about 4.

22. The process of claim 9 wherein the pH is adjusted with said basic material to between about 7 and about 7.5.

* * * * *